Oct. 10, 1950

B. N. ASHTON ET AL 2,524,952

ON-OFF CHECK VALVE

Filed May 10, 1947

INVENTORS.
BENJAMIN N. ASHTON
WILLIAM B. WESTCOTT, JR.
BY
THEIR ATTORNEYS.

Patented Oct. 10, 1950

2,524,952

UNITED STATES PATENT OFFICE 2,524,952

ON-OFF CHECK VALVE

Benjamin N. Ashton and William B. Westcott, Jr., Kingston, N. Y., assignors to Electrol Incorporated, Kingston, N. Y., a corporation of Delaware Application May 10, 1947, Serial No. 747,207

4 Claims. (Cl. 251—132)

This invention relates to improvements in valves, and it has as a principal object the provision of a valve which can be adjusted to act as a check valve or opened to permit flow of liquid in either direction therethrough.

Another object of the invention is to provide a simple form of check and on-off valve which is readily assembled and which may be retained in assembled relationship by an element used to mount it on a panel or other structure.

Other objects of the invention will become apparent from the following description of a typical form of valve embodying the present invention.

In accordance with the present invention, we have provided a valve including a ball check valve located between an inlet and an outlet port in a valve casing, this check valve being normally arranged to permit flow of liquid in one direction and prevent the flow of liquid in another direction. Cooperating with the ball of the ball check valve is a second ball or other valve-actuating element which may be moved by a rotary cam element to unseat the ball of the check valve to permit the flow of liquid in either direction.

The cam for lifting the ball valve from its seat may be a cylindrical element having a cam face thereon. The cylindrical element may be retained in the valve casing by means of a bolt or screw used for securing the valve casing to a panel or other structural element on which the valve is to be mounted.

More particularly, the cylinder cam member may be provided with a transverse slot through which the bolt or screw extends so as to prevent endwise movement of the cam while permitting limited rotary movement between a position in which the ball valve is seated and another position in which the ball valve is unseated. The above-described valve construction is very simple and may be easily manufactured with relatively few precision machining operations. It is formed of a relatively small number of parts which can be easily and quickly assembled and disassembled. It is highly effective under all conditions of operation even at extremely high pressures, for example, pressures as high as 1500 pounds per square inch, while at the same time being sensitive to small variations of the pressure exerted in a direction to unseat the ball valve.

Figure 1:
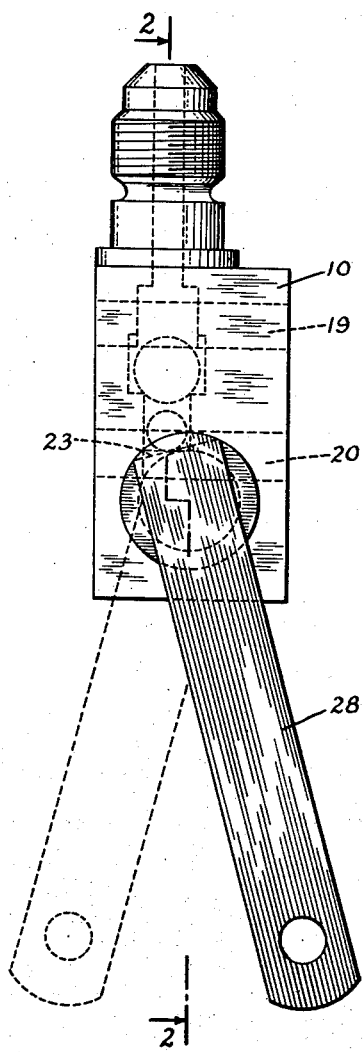
Figure 2:
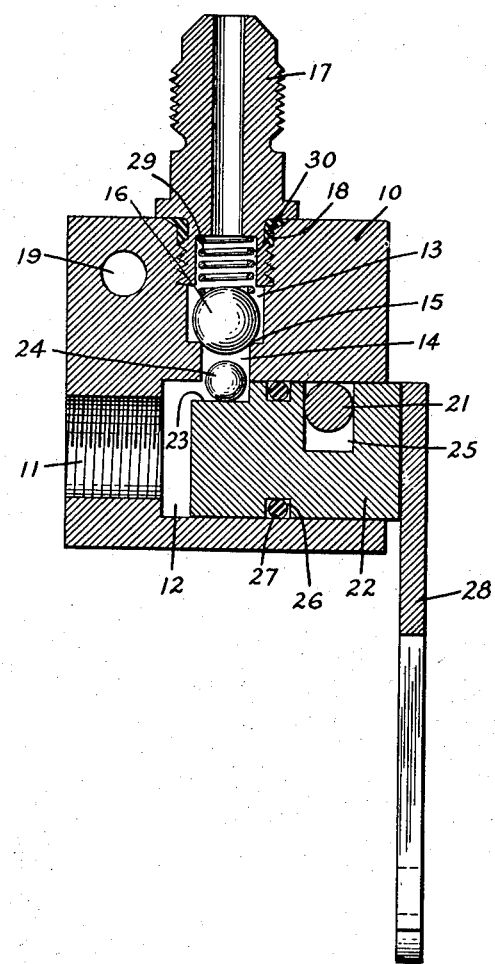

For a better understanding of the present invention, reference may be had to the accompanying drawing in which:

Figure 1 is an end view of a typical form of valve embodying the present invention; and Figure 2 is a view in section taken on line 2—2 of Figure 1.

The valve chosen for purposes of illustration includes a block-like valve casing member 10 which may be formed of any desired material, such as for example, aluminum or aluminum alloys. The valve casing is provided with an internally threaded bore 11 which may be connected to a conduit. The casing 10 is counterbored from the opposite edge to provide a cam-receiving chamber 12 which extends slightly more than half-way across the casing into communication with the bore 11. The chamber 12 may be of somewhat larger diameter than the threaded bore 11.

At right angles to and communicating with the bore 12 is another bore 13 which is provided with a restriction 14 forming a shoulder 15 which constitutes the seat for the ball valve 16. The axis of the bore 13 is offset slightly from the axis of the bore 12.

The upper end of the bore 13 is internally threaded to receive a coupling 17 by means of which the passage 13 may be connected to a conduit or other element.

Leakage between the coupling 17 and the casing 10 is avoided by means of a seal or compressed gasket 18.

The casing 10 is further provided with a pair of transverse openings 19 and 20 for receiving bolts or screws to secure the valve to a suitable supporting element, not shown. The opening 20 is so positioned that it intersects the bore 12 near its right-hand end so that the fastening element 21 extends through the bore 12. The fastening element 21 is used to retain the cam member 22 in the bore 12. The cam member 22 consists of a generally cylindrical member having a substantially flat cam surface 23 thereon for supporting and displacing an actuating ball 24. The cam member 22 is also provided with a transversely extending slot 25 of somewhat greater depth than the thickness of the fastening member 21 to permit rocking movement of the cam member in the bore 12. Also, the cam member is provided with a peripheral groove 26 in which is mounted a rubbery sealing ring member 27 for preventing leakage of the liquid between the casing and the cam member 22.

The outer end of the cam member 22 may be provided with a handle 28 of strap-like or any other desired form.

When the handle 28 and the cam member 22 are in the position shown in Figure 1, the cam surface 23 is positioned so that the actuating ball 24 is spaced below the ball valve 16 and the latter is urged against the seat 15 by means of the spring 29 which bears against its upper surface and is received in a cavity 30 in the coupling 17. The spring 29 preferably applies a very light pressure against the ball valve 16 so that it can be unseated by light fluid pressure exerted against the ball valve through the inlet port 11 and the bore 12. The ball is, however, seated sufficiently firmly by the spring 29 that fluid pressure exerted through the coupling 17 will seat the ball more firmly and prevent flow of liquid through the coupling 17 to the port 11.

If it is desired to permit liquid to flow from the coupling 17 to the bore 11, the handle 28 may be rocked to the dotted line position shown in Figure 1. Inasmuch as the axis of the cam-member 22 is offset slightly from the axis of the bore 13, the cam surface 23 lifts up the actuating ball 24 to unseat the ball valve 29 and allow the flow of liquid in either direction with a relatively small angular movement of the handle 28.

While the valve casing has been illustrated as generally rectangular or square in plan and elevation, it will be understood that it may take other shapes, such as for example, disc-like, hexagonal or the like. Also, if desired, a non-circular plug loosely fitting in the bore 14 may be substituted for the actuating ball 24. Also, the valve handle may be modified as the purpose demands. Therefore, it will be understood that the valve is susceptible to considerable modification without departing from the invention. Accordingly, the above-described valve should be considered as illustrative of the invention and not as limiting the scope of the following claims.

We claim:

1. A valve comprising a casing having a pair of intersecting bores therein, means in one of said bores forming a valve seat, a ball valve cooperating with said seat, resilient means urging said ball valve against said seat and toward the other bore, a cylindrical member rotatably fitting in said other bore and having a cam surface adjacent to its inner end and in alignment with said valve seat, an actuating element loosely mounted in said one of said bores between said seat and said cam surface, and movable by the latter against said ball valve to lift said ball valve from said seat, and away from said ball valve to allow said urging means to seat said ball valve, coupling elements communicating with said bores for introducing liquid into and discharging it from said bores, a circumferential groove in said cylindrical member, a rubbery ring in said groove engaging the casing around said other bore to prevent leakage past said member, a transverse opening in said member spaced from said groove, and a retaining member of less thickness than the height of said opening and of substantially the same width as said opening extending across said other bore and through said opening to permit limited rotation of said member and retain it against endwise movement.

2. A valve comprising a casing having a pair of intersecting bores therein, a shoulder in one of said bores forming a valve seat, a ball valve cooperating with said seat, resilient means urging said ball valve against said seat and toward the other bore, a member rotatably mounted in said other bore having a cam surface adjacent to but spaced from said valve seat, and a transverse notch spaced from said cam surface, an actuating member loosely mounted in said one of said bores between said seat and said cam surface, and movable by the latter against said ball to lift said ball from said seat and away from said ball valve to allow said urging means to seat said ball valve, a fastening member mounted in said casing and extending through said notch for preventing endwise and limiting rotary movement of said rotatable member, and coupling elements communicating with said bores for introducing liquid into and discharging it from said bores.

3. A valve comprising a casing having a first bore extending transversely therethrough and providing a port at one end and an open opposite end, and a second bore extending from the exterior of said casing into communication with said first bore, a shoulder in said second bore between the exterior of said casing and said first bore, a ball valve in said second bore outwardly of said shoulder, a spring in said second bore urging said ball valve against said shoulder, a substantially cylindrical cam member rotatable in and extending into said first bore through said open end and having a cam surface substantially in alignment with said second bore, and a transverse notch spaced from said cam surface, an actuating member loosely mounted in said second bore between said ball valve and said cam surface, the latter being shaped to displace said actuating member into engagement with and move said ball valve away from said seat upon partial rotation of said cam member, and means extending through said notch and said casing for limiting the rotation of said cam member and for securing said casing to a support.

4. A valve comprising a casing having a pair of intersecting bores therein, means in one of said bores forming a valve seat, a ball valve cooperating with said seat, resilient means urging said ball valve against said seat and toward the other bore, a cylindrical member rotatably fitting in said other bore having a cam surface adjacent to its inner end in alignment with said one of said bores and a transverse notch spaced from said cam surface, an actuating member loosely mounted in said one of said bores between said seat and said cam surface and movable by the latter against said ball to lift the latter from said seat, and further movable away from said ball valve to allow said urging means to seat said ball valve, a retaining element extending crosswise of said other bore and through said notch for limiting rotary movement of said rotatable member and retaining it against axial movement, and means forming ports communicating with said bores for introducing liquid into and discharging it from said bores.

BENJAMIN N. ASHTON.
WILLIAM B. WESTCOTT, Jr.

REFERENCES CITED

The following references are of record in the file of this patent:

UNITED STATES PATENTS

| Number | Name | Date |
|---|---|---|
| 299,669 | Montgomery | June 3, 1884 |
| 766,416 | Booth | Aug. 2, 1904 |
| 796,392 | Bailey | Aug. 1, 1905 |
| 1,374,308 | MacIsaac | Apr. 12, 1921 |
| 1,425,266 | Marshall | Aug. 8, 1922 |

FOREIGN PATENTS

| Number | Country | Date |
|---|---|---|
| 769,442 | France | of 1934 |
| 790,667 | France | of 1935 |